(12) United States Patent
Wu et al.

(10) Patent No.: US 11,743,925 B2
(45) Date of Patent: Aug. 29, 2023

(54) RESOURCE ALLOCATION FOR UPLINK CONTROL INFORMATION (UCI) AND DATA MULTIPLEXING ON A PHYSICAL UPLINK SHARED CHANNEL (PUSCH)

(71) Applicant: QUALCOMM Incorporated, San Diego, CA (US)

(72) Inventors: Liangming Wu, Beijing (CN); Yu Zhang, Beijing (CN); Chao Wei, Beijing (CN); Chenxi Hao, Beijing (CN); Joseph Binamira Soriaga, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/768,677

(22) PCT Filed: Nov. 5, 2018

(86) PCT No.: PCT/CN2018/113976
§ 371 (c)(1),
(2) Date: May 31, 2020

(87) PCT Pub. No.: WO2019/105182
PCT Pub. Date: Jun. 6, 2019

(65) Prior Publication Data
US 2021/0195597 A1    Jun. 24, 2021

(30) Foreign Application Priority Data

Dec. 1, 2017    (WO) ................ PCT/CN2017/114218

(51) Int. Cl.
*H04W 72/53*    (2023.01)
*H04B 7/06*    (2006.01)
(Continued)

(52) U.S. Cl.
CPC .......... *H04W 72/53* (2023.01); *H04B 7/0626* (2013.01); *H04L 1/0007* (2013.01); *H04L 5/0053* (2013.01); *H04W 72/21* (2023.01)

(58) Field of Classification Search
None
See application file for complete search history.

(56) References Cited

U.S. PATENT DOCUMENTS

2008/0153425 A1*  6/2008  Heo ....................... H04L 1/001
                                                        455/68
2016/0021653 A1   1/2016  Papasakellariou et al.
(Continued)

FOREIGN PATENT DOCUMENTS

CN    102170647 A    8/2011
CN    102263617 A    11/2011
(Continued)

OTHER PUBLICATIONS

CATT: "UCI Handling for NR", 3GPP TSG RAN WG1 Meeting #87, R1-1611395, Nov. 18, 2016, 2 pages.
(Continued)

*Primary Examiner* — Rebecca E Song
(74) *Attorney, Agent, or Firm* — Patterson + Sheridan, L.L.P./Qualcomm

(57) ABSTRACT

Certain aspects of the present disclosure relate to methods and apparatus relating to multiplexing UCI with data in a physical uplink shared channel (PUSCH) transmission.

23 Claims, 10 Drawing Sheets

(51) Int. Cl.
*H04L 1/00* (2006.01)
*H04L 5/00* (2006.01)
*H04W 72/21* (2023.01)

(56) References Cited

U.S. PATENT DOCUMENTS

| | | | | |
|---|---|---|---|---|
| 2018/0110041 | A1* | 4/2018 | Bendlin | H04L 5/0051 |
| 2018/0332577 | A1* | 11/2018 | Yang | H04L 5/0055 |
| 2019/0215823 | A1* | 7/2019 | Kim | H04L 1/0073 |
| 2020/0099432 | A1* | 3/2020 | Maattanen | H04L 5/00 |
| 2020/0274637 | A1* | 8/2020 | Li | H04L 5/0053 |

FOREIGN PATENT DOCUMENTS

| | | | |
|---|---|---|---|
| WO | 2011040648 | A1 | 4/2011 |
| WO | 2011158968 | A1 | 12/2011 |
| WO | 2017019132 | A1 | 2/2017 |
| WO | WO 2017142581 | A1 | 8/2017 |

OTHER PUBLICATIONS

International Search Report and Written Opinion—PCT/CN2017/114218—ISA/EPO—dated Mar. 29, 2018.
International Search Report and Written Opinion—PCT/CN2018/113976—ISA/EPO—dated Jan. 30, 2019.
Samsung: "UCI and Data Multiplexing", 3GPP Draft; R1-1700953 UCI and Data Multiplexing-Samsung, 3rd Generation Partnership Project (3GPP), Mobile Competence Centre; 650, Route Des Lucioles; F-06921 Sophia-Antipolis Cedex; France, vol. RAN WG1, no. Spokane, USA; Jan. 16, 2017-Jan. 20, 2017, Jan. 16, 2017 (Jan. 16, 2017), pp. 1-5, XP051208469, Retrieved from the Internet: URL: http://www.3gpp.org/ftp/Meetings_3GPP_SYNC/RAN1/Docs/ [retrieved on Jan. 16, 2017].
Huawei, et al., "On UCI Multiplexing", 3GPP Draft, 3GPP TSG RAN WG1 Meeting #91, R1-1719397, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369306, 9 Pages. Retrieved from the Internet: URL: http://www.3gpp.org/ftp/tsg%5Fran/WG1%5FRL1/TSGR1%5F91/Docs/, [Retrieved on Nov. 18, 2017], p. 1, 1 Introduction pp. 1-4, 2 UCI piggyback on PUSCH, the whole document.
Intel Corporation: "Long PUCCH for Moderate and Large Payload", 3GPP Draft, 3GPP TSG RAN WG1 NR Ad Hoc Meeting, R1-1710554, Long PUCCH for More Than 2 UCI Bits, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051299761, 3 Pages, Retrieved from the Internet: URL: http://www.3gpp.org/ftp/Meetings_3GPP_SYNC/RAN1/Docs/. [Retrieved on Jun. 26, 2017] the whole document.
Intel Corporation: "UCI Embedding and PUSCH/PUCCH Multiplexing", 3GPP Draft, 3GPP TSG RAN WG1 Meeting 90bis, R1-1717388, Intel UCI PUCCH PUSCH Multiplexing, 3rd Generation Partnership Project (3GPP), Mobile Competence Centre, 650, Route Des Lucioles, F-06921 Sophia-Antipolis Cedex, France, vol. Ran WG1, No. Prague, CZ, 20171009 -20171013, Oct. 8, 2017 (Oct. 8, 2017), XP051340578, 8 Pages, Retrieved from the Internet: URL: http://www.3gpp.org/ftp/Meetings_3GPP_SYNC/RAN1/Docs/. [Retrieved on Oct. 8, 2017] the whole document.
Supplementary European Search Report—EP18883887—Search Authority—The Hague—dated Aug. 2, 2021.

* cited by examiner

RESOURCE ALLOCATION FOR UPLINK CONTROL INFORMATION (UCI) AND DATA MULTIPLEXING ON A PHYSICAL UPLINK SHARED CHANNEL (PUSCH)

CROSS-REFERENCE TO RELATED APPLICATION & PRIORITY CLAIM

This application for Patent is a national stage application under 35 U.S.C. § 371 of PCT/CN2018/113976, filed Nov. 5, 2018, which claims the benefit of and priority to International Patent Cooperation Treaty Application No. PCT/CN2017/114218, filed Dec. 1, 2017 which are both assigned to the assignee hereof and hereby expressly incorporated by reference herein as if fully set forth below and for all applicable purposes.

BACKGROUND

Field of the Disclosure

The present disclosure relates generally to communication systems, and more particularly, to methods and apparatus relating to multiplexing uplink control information (UCI) and data.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a UE. The method generally includes determining a total amount of allocated resources for transmitting both uplink data and uplink control information (UCI) in a physical uplink shared channel (PUSCH) transmission, determining a maximum supported payload size for transmitting the UCI based, at least in part, on the total amount of allocated resources and a minimum amount of resources allocated for the uplink data, and transmitting uplink data and UCI in the PUSCH, based on the total amount of allocated resources and determined maximum supported payload size.

Aspects also include methods, apparatus, systems, computer readable mediums, and processing systems capable of performing the operations described above, and as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
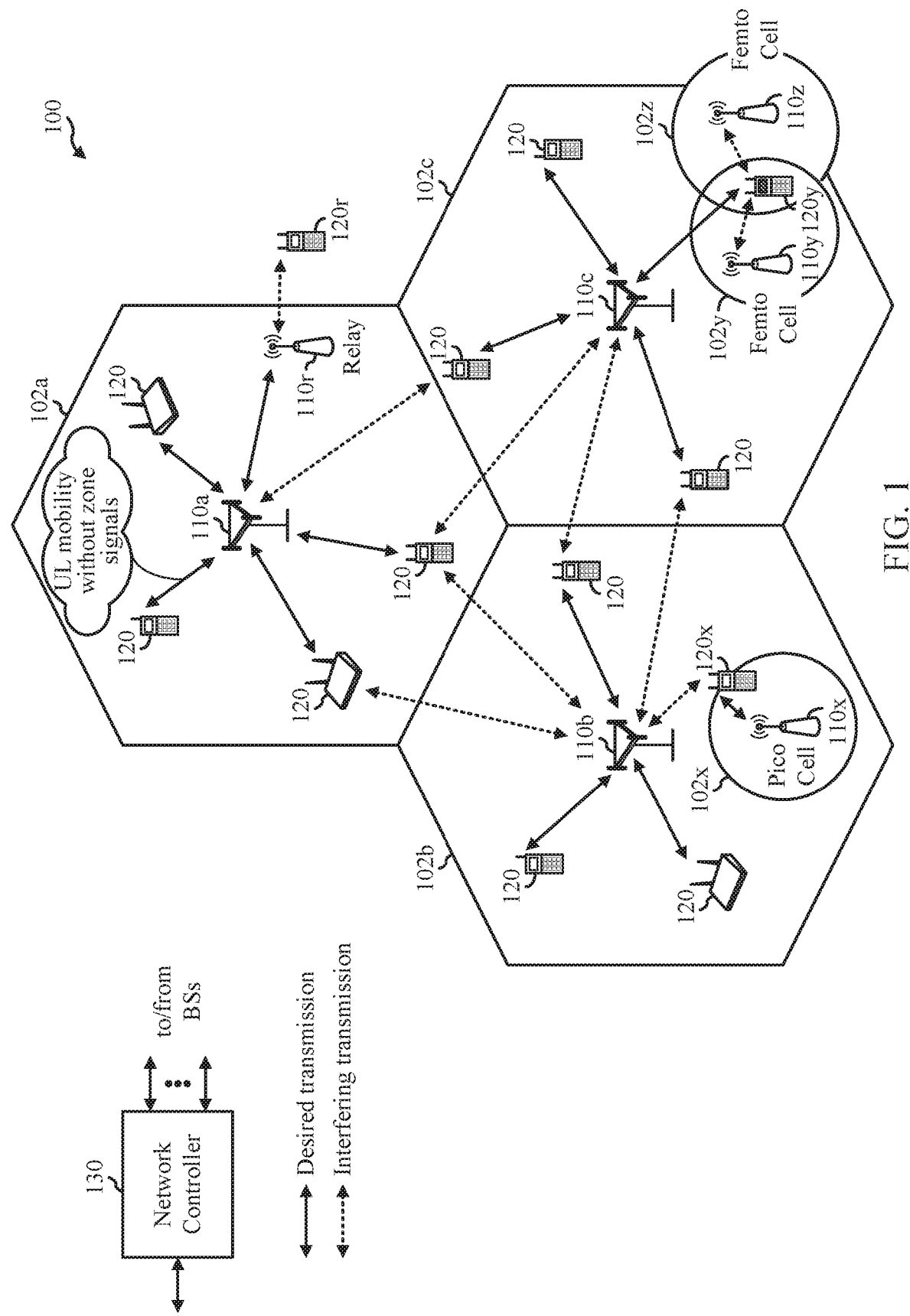
FIG. 1 is a block diagram conceptually illustrating an example telecommunications system, in accordance with certain aspects of the present disclosure.

Aspects of the present disclosure relate to methods and apparatus relating to rules for multiplexing UCI and data, for example, in a single physical uplink shared channel (PUSCH) transmission.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals-in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
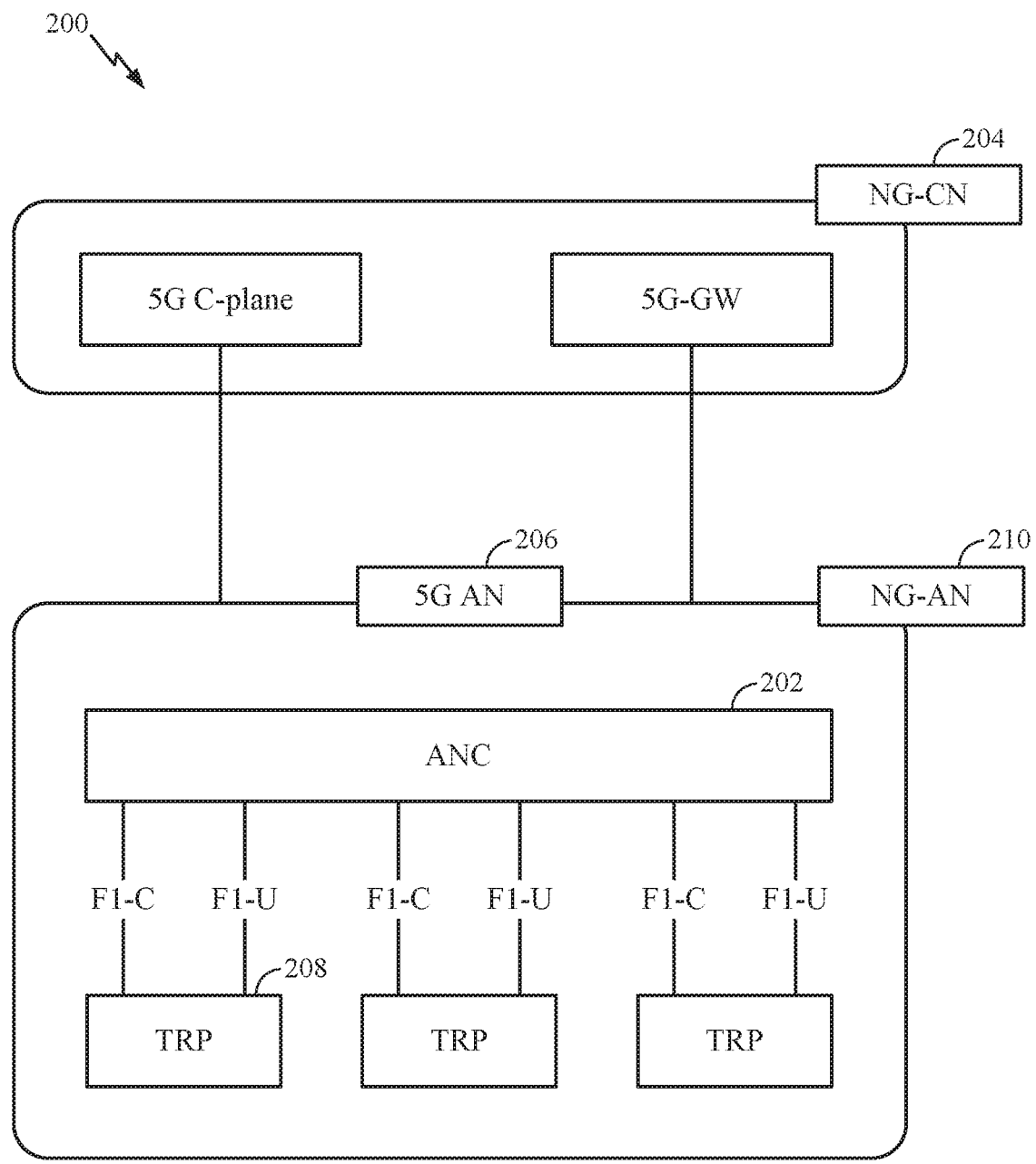
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
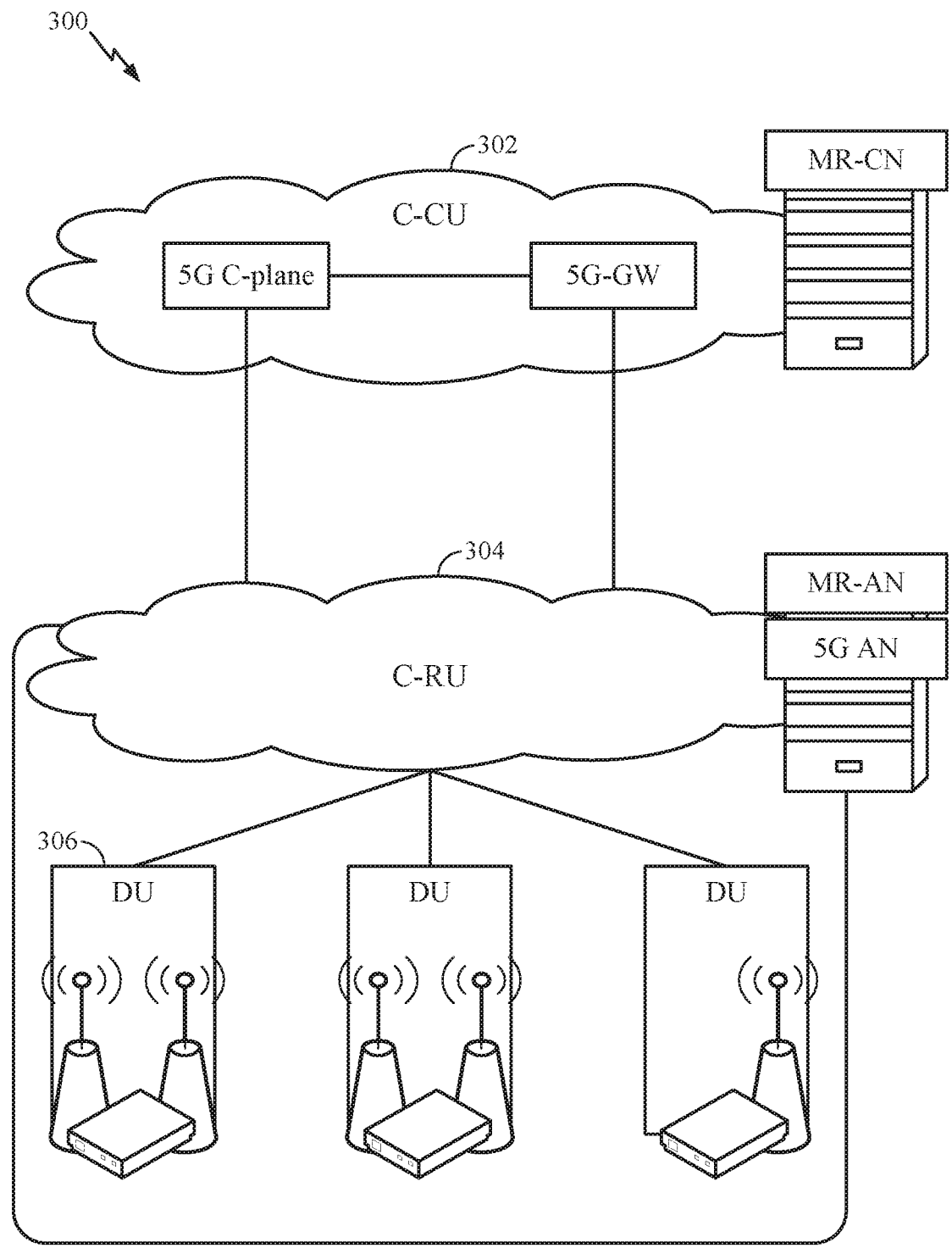
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
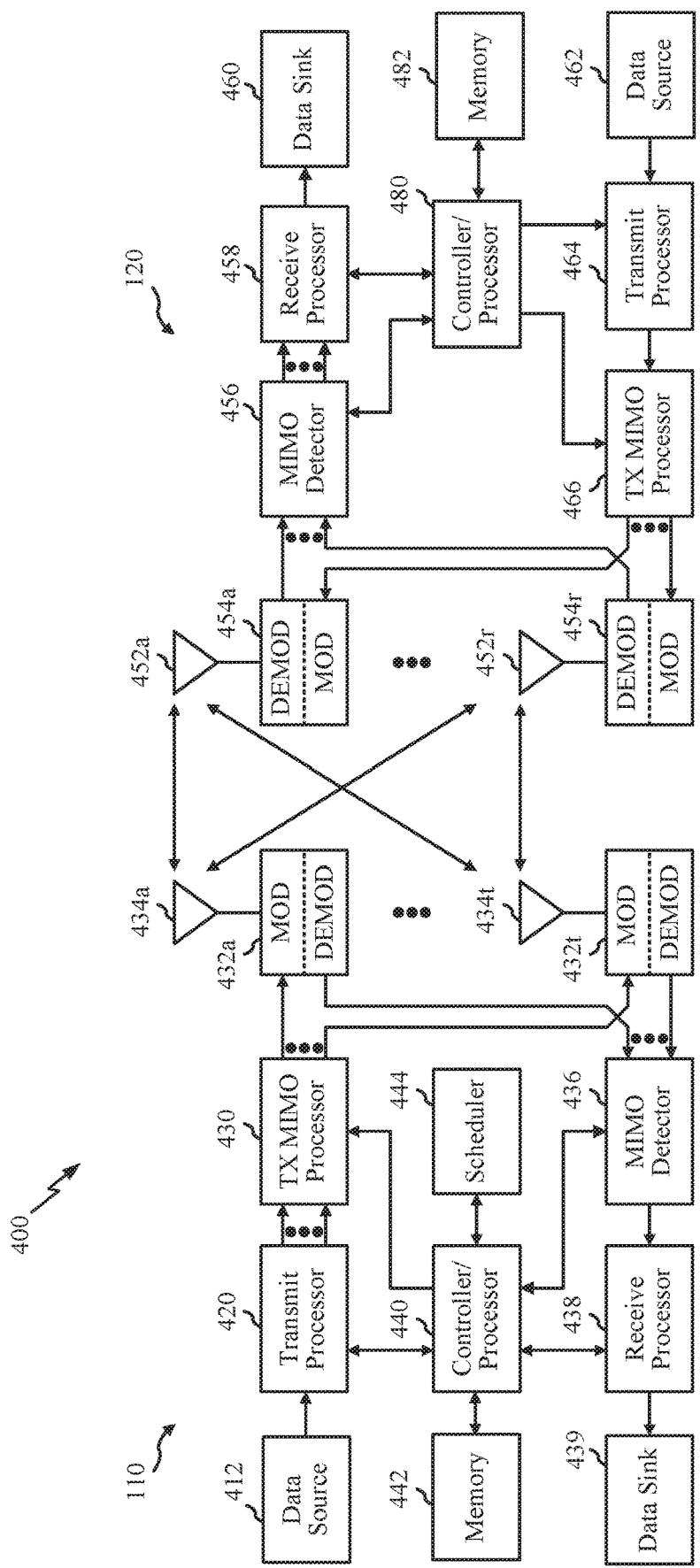
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 9, 10, and 11, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
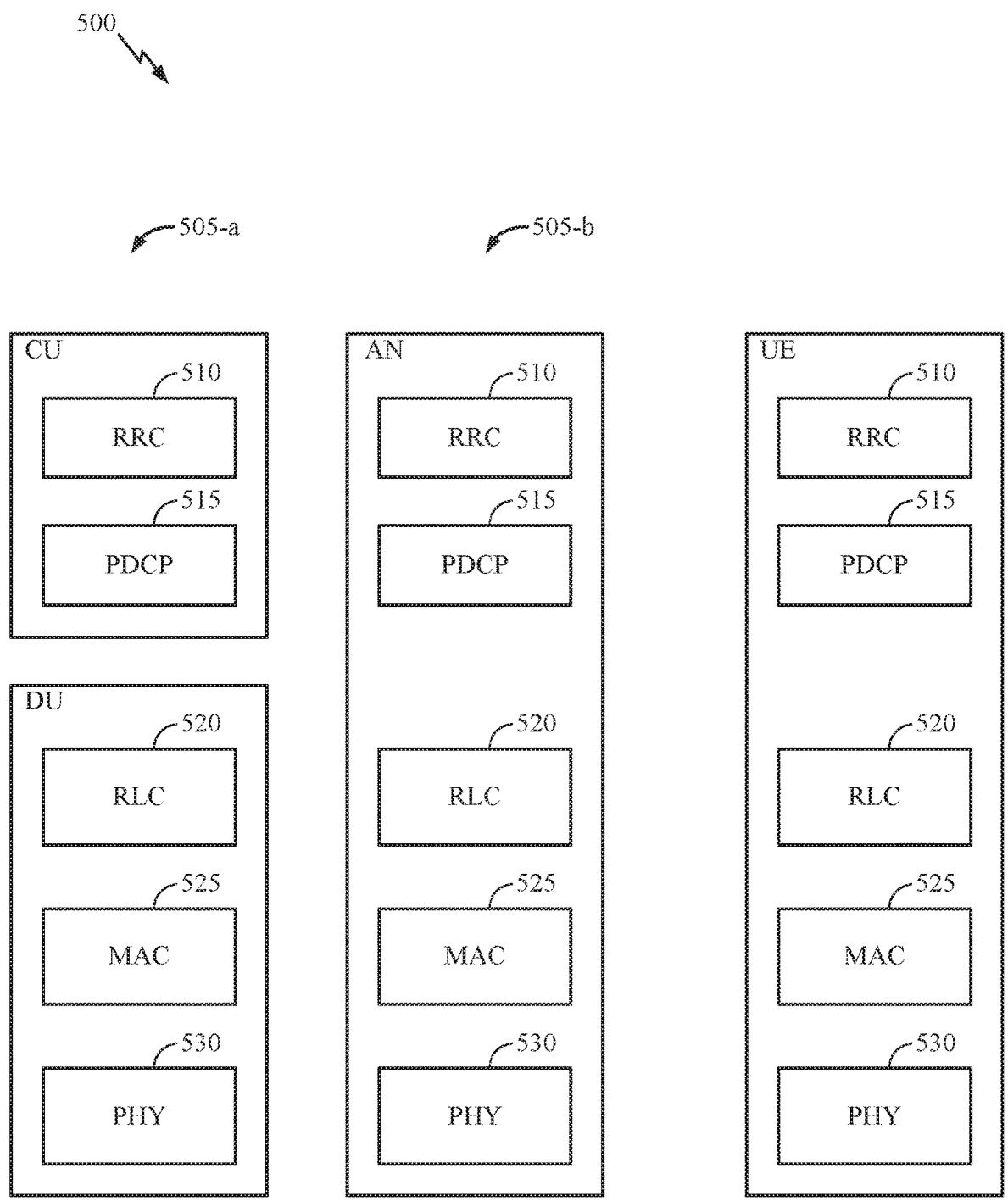
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
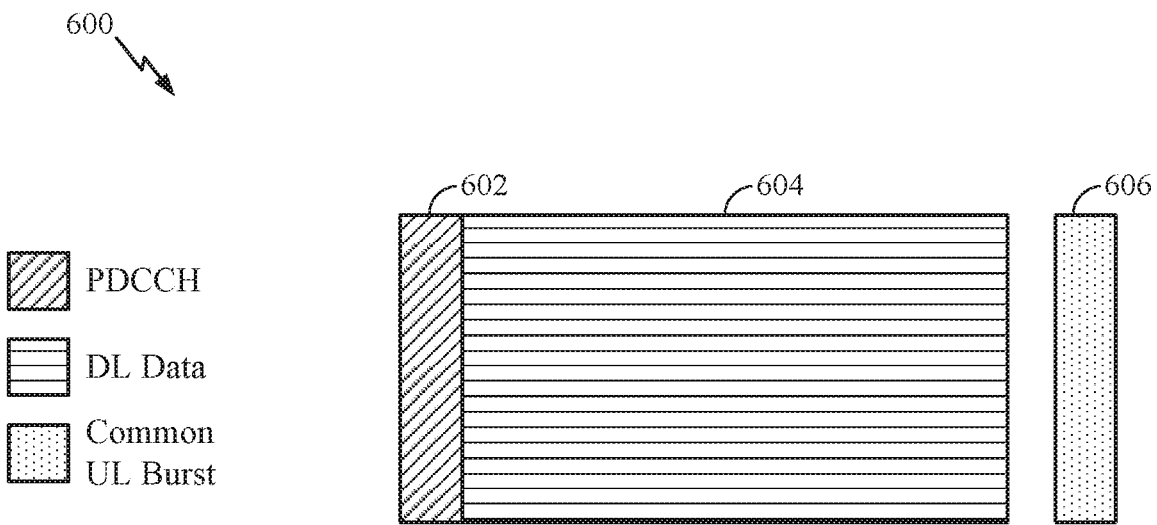
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
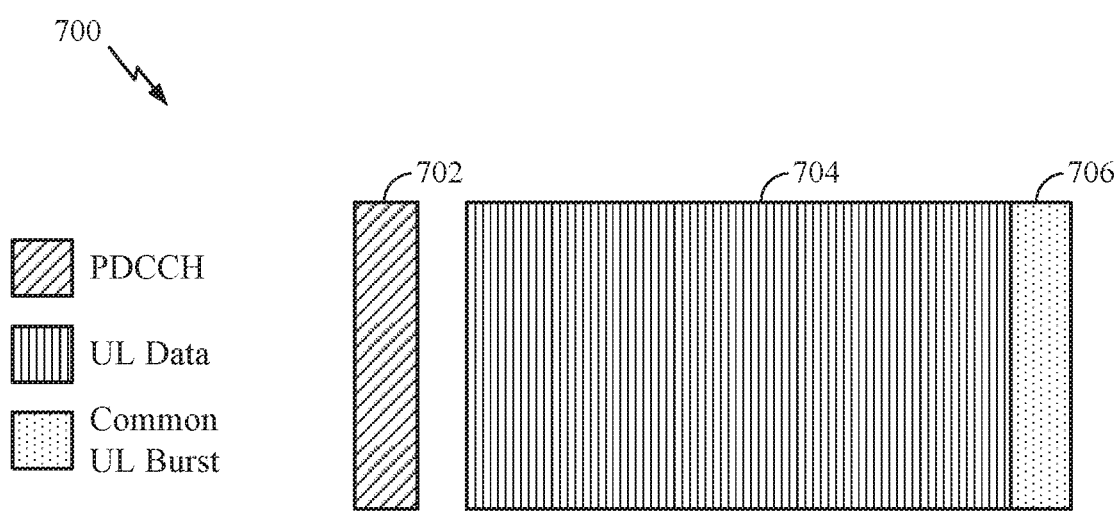
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services. UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Slot Design

In mobile communication systems conforming to certain wireless communications standards, such as the Long Term Evolution (LTE) standards, certain techniques may be used to increase the reliability of data transmission. For example, after a base station performs an initial transmission operation for a specific data channel, a receiver receiving the transmission attempts to demodulate the data channel during which the receiver performs a cyclic redundancy check (CRC) for the data channel. If, as a result of the check, the initial transmission is successfully demodulated, the receiver may send an acknowledgement (ACK) to the base station to acknowledge the successful demodulation. If, however, the initial transmission is not successfully demodulated, the receiver may send a non-acknowledgement (NACK) to the base station. A channel that transmits ACK/NACK is called a response or an ACK channel.

In some cases, under the LTE standards, an ACK channel may comprise two slots (i.e. one subframe) or 14 symbols, which may be used to transmit an ACK that may comprise one or two bits of information. In some cases, when transmitting ACK channel information, a wireless device may perform frequency hopping. Frequency hopping refers to the practice of repeatedly switching frequencies within a frequency band in order to reduce interference and avoid interception.

Figure 8A:
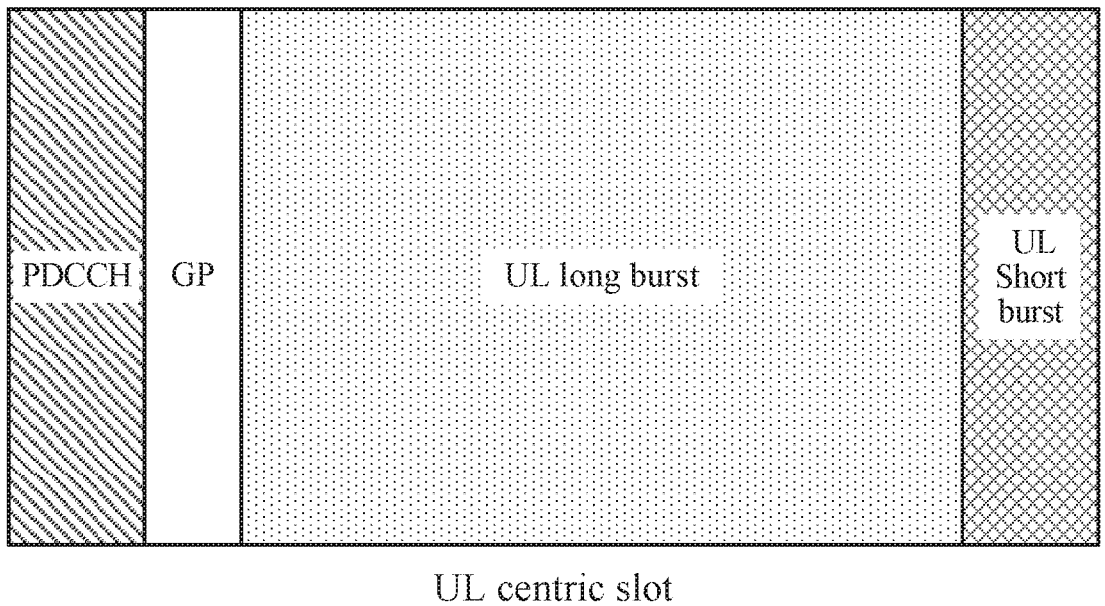
FIGS. 8A and 8B illustrate example uplink and downlink structures, respectively, in accordance with certain aspects of the present disclosure.

Under other wireless communications standards, such as NR, the ACK channel information as well as other information may be transmitted through an uplink structure shown in FIG. 8a. FIG. 8a illustrates an example uplink structure with a transmission time interval (TTI) that includes a region for long uplink burst transmissions. The long uplink burst may transmit information such as acknowledgment (ACK), channel quality indicator (CQI), or scheduling request (SR) information.

Figure 8B:
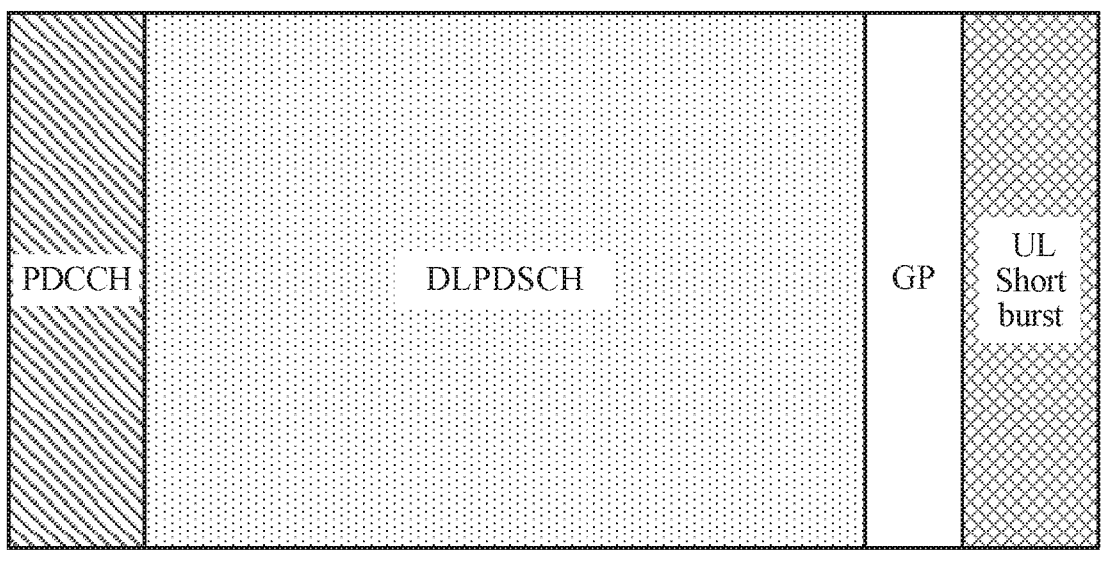

The duration of the region for long uplink burst transmissions, referred to in FIG. 8 as "UL Long Burst," may vary depending on how many symbols are used for the physical downlink control channel (PDCCH), the gap, and the short uplink burst (shown as UL Short Burst), as shown in FIG. 8. For example, the UL Long Burst may comprise a number of slots (e.g., 4), where the duration of each slot may vary from 4 to 14 symbols. FIG. 8b also shows a downlink structure having a TTI that includes PDCCH, downlink physical downlink shared channel (PDSCH), a gap, and an uplink short burst. Similar to the UL Long Burst, the duration of the DL PDSCH may also depend on the number of symbols used by the PDCCH, the gap, and the uplink short burst.

As noted above, UL short burst may be 1 or 2 symbols and different approaches may be used to transmit UCI in this duration. For example, according to a "1 symbol" UCI design, 3 or more bits of UCI may be sent using frequency division multiplexing (FDM). For 1 or 2 bits of acknowledgment (ACK) or a 1 bit scheduling request (SR), a sequence based design may be used. For example, an SR may be sent with 1 sequence, on-off keying, and may multiplex up to 12 users per RB. For a 1-bit ACK, 2 sequences may be used, and up to 6 users may be multiplexed per RB. For a 2-bit ACK, 4 sequences may be used and up to 3 users may be multiplexed per RB.

example RE mapping rule for UCI piggyback on PUSCH

There are a number of approaches to multiplex simultaneous PUCCH and PUSCH from a same UE that may be provided. For example, a first approach may include transmitting PUCCH and PUSCH on different RBs, such as, FDM PUCCH and PUSCH. A second approach may include piggybacking PUCCH on assigned PUSCH RBs. Both approaches may be supported in NR.

UCI piggybacking on PUSCH may include, for frequency first mapping, UCI resource mapping principles (e.g., around RS) that may be common for PUSCH with DFT-s-OFDM waveform and CP-OFDM waveform. UCI piggybacking on PUSCH may also include UL data that may be rate-matched around the UCI at least for a periodic CSI report configured by RRC and/or a aperiodic CSI report triggered by UL grant.

In one or more cases, slot-based scheduling for HARQ-ACK with more than two bits may include PUSCH that is rate-matched. In some cases, PUSCH may be punctured for slot-based scheduling for HARQ-ACK with up to two bits. In one or more cases, NR may provide a sufficiently reliable common understanding on HARQ-ACK bits between gNB and UE. In some cases, additional considerations may be taken into account regarding channel multiplexing of PUCCH and PUSCH.

Considerations associated with UCI piggybacking on PUSCH may include how to decide the HARQ-ACK piggyback rule. For example, if PUSCH is punctured by ACK, in the case of a large ACK payload size, the impact to PUSCH decoding performance may be non-negligible. If PUSCH is rate-matched around ACK, in cases where a UE miss-detects DCI, an eNB and UE may have different assumption on the number of ACK bits piggybacked on PUSCH, which may require the eNB to performance blind detection to solve such an ambiguity. Further, as the ACK payload size increases, a number of blind detections that the eNB may need to perform may also increase.

Example Resource Allocation for UCI and Data Multiplexing on PUSCH

Aspects of the present disclosure provide various techniques that may allow both the network (base station/gNB) and UE to identify what PUSCH resources are available for transmitting UCI that has a dynamic payload.

As noted above, uplink control information (UCI) may be carried via PUSCH. UCI can convey different types of information, such as ACK/NACK and CSI reporting. CSI reporting types can also vary, for example, with different types including semi-persistent CSI and aperiodic CSI. With either type, CSI reporting can be wideband, partial band, or subband.

In some cases, the UCI payload may vary dynamically (e.g., depending on the type and amount of information to be reported). For example, CSI reporting may include Type I and Type II feedback. Type I feedback may include standard resolution CSI feedback for single antenna panels and/or multiple panels. Type II feedback may include higher resolution CSI feedback (e.g., targeting MU-MIMO).

When UCI and data are jointly reported (multiplexed) on the same PUSCH, the PUSCH is shared between UCI and data In LTE, the amount of UCI bits is fixed and known to the base station, and base station can allocate proper resource for both UCI and data.

As noted above, in NR, the UCI payload may be dynamic. This may present a challenge for base station to properly allocate resources to UCI and data. For instance, if UCI is always prioritized over data, a base station may not allocate sufficient resource for both partial UCI (such as subband PMI omission) and all data. This may result in degradation of the data throughput in UL.

Techniques presented herein provide for proper resource allocation to account for the dynamic adjustment of the maximum supported payload size for UCI (e.g., part2 CSI), based on the amount of UL data.

Figure 9:
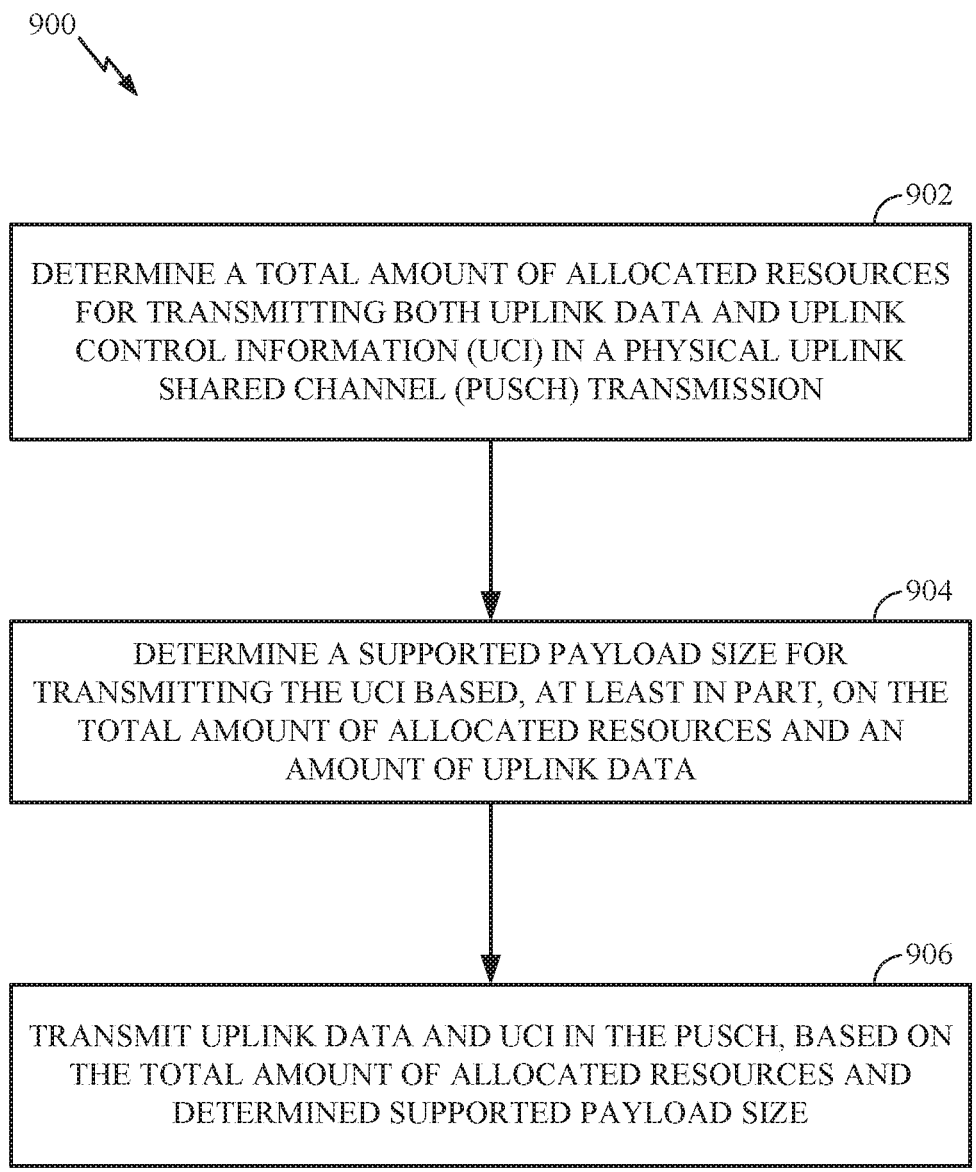
FIG. 9 illustrates example operations for wireless communications by a user equipment (UE), in accordance with certain aspects of the present disclosure.

For example, FIG. 9 illustrates example operations 900 for wireless communications by a UE to determine resources available to multiplex UCI and data, in accordance with certain aspects of the present disclosure.

Operations 900 begin, at 902, by determining a total amount of allocated resources for transmitting both uplink data and uplink control information (UCI) in a physical uplink shared channel (PUSCH) transmission.

At 904, the UE determines a supported payload size for transmitting the UCI based, at least in part, on the total amount of allocated resources and an amount of resources allocated for the uplink data.

At 906, the UE transmits uplink data and UCI in the PUSCH, based on the total amount of allocated resources and determined supported payload size.

In this manner, aspects of the present disclosure may accommodate UCI having a dynamic (and often large) payload size. For example, aspects of the present disclosure may be used in NR systems, where the payload size of CSI can be very large (e.g., Type-II CSI with rank-2 CS reporting). In such cases, a CSI omitting rule that determines when to drop certain CSI information is supported. In some cases, only one subband may be reported if the resource on PUSCH is insufficient for wider band CSI reporting.

To support such dynamic CSI payload size in this manner, aspects of the present disclosure can help prioritize certain types of bits during resource allocation, when multiplexing UCI and data.

According certain solutions, a maximum supported payload size (referred to as J_max) for part2 CSI may be changed dynamically accordingly with the amount of UL data. In such cases, a UE may determine the maximum supported payload size based on a pre-configuration or based on the maximum amount of resources for CSI payload. If the CSI payload is less than the maximum supported payload size for UCI (e.g., is less than J_max), the entire CSI may be transmitted. On the other hand, if the part2 CSI is larger than J_max, then CSI omitting will occur and reduce the part2 CSI less than or equal to J_max.

In some cases, a UE may determine a maximum supported payload size based on a maximum supported coding rate (Rmax) for UL data. Rmax may be signaled by the network, for example, via higher layer signaling, semi-static signaling or lower layer signaling. As an example, Rmax may be determined according to the following formula:

$Rmax = min(Rmcs + \Delta, R\_bound)$, where Rmcs is the coding rate indicated in MCS, $\Delta$ is offset of allowed coding rate offset. R_bound is the upper bound limitation for coding rate, $\Delta$ and R_bound can be higher layer configured. Rmax may determine the minimum resource allocation for data and, hence, may be used to determine the maximum resource allocation for UCI (e.g., CSI, HARQ-ACK/NACK, SR).

CSI payload, especially for part2 CSI reporting (e.g., the undermined part) can be calculated based on other UCI parts (ACK/NACK, SR, part1 CSI) resource allocation, which can be used to further determine the maximum number of payload size of part2 CSI (J_max). As an example, if the minimal resource (in REs) for the UL data part becomes:

$N1 = \lceil Ndata/Rmax/Q \rceil$, where Q is number of bits carried per RE, which depends on an UL MCS configuration. The maximum allocated resource for UCI, may be found as:

$N2 = N0 - N1$ where N0 is the total number of allocated REs for PUSCH. By subtracting other UCI part occupied REs (such as ACK/NACK, RI/CRI/CQI in part1), the part2 UCI REs can be found as:

$Npart2 = N2 - Npart1 - Nack$

Then the payload J_max can be found as:

$J\_max = \lfloor Npart2 * Q/Rmcs \rfloor$, where Q is the number of bits carried per RE and Rmcs is the coding rate of PUSCH from DCI signaling.

In some cases, the minimum resources (e.g., the minimum number of RBs or REs) for data may be signaled to the UE. For example, the minimum number of RBs or REs may be signaled via higher layer signaling, semi-static signaling or lower layer signaling. As an example, downlink control information (DCI) signaling may indicate the RBs allocation for both data and UCI, and a higher layer configured parameter that determines the minimal portion of RBs to be allocated for UL data may be signaled, such that:

$min\_RB\_data = RB\_total(allocated\ via\ DCI) * alpha$, where alpha may be a parameter indicated via higher layer signaling. The maximum available resource for part2 CSI may then be further derived as:

$max\_RB\_UCI = RB\_total - min\_RB\_data$, $max\_RE\_UCI = max\_RB\_UCI * Q$(modulation order for UCI)

$max\_RE\_part2\_CSI = max\_RE\_UCI - RE\_ACK - RE\_part1\_CSI$ $J\_max = \lfloor max\_RE\_part2\_CSI/Q \rfloor$.

In general, a maximum number of REs available for UCI may be derived based on a minimum number of REs for data.

Figure 10:
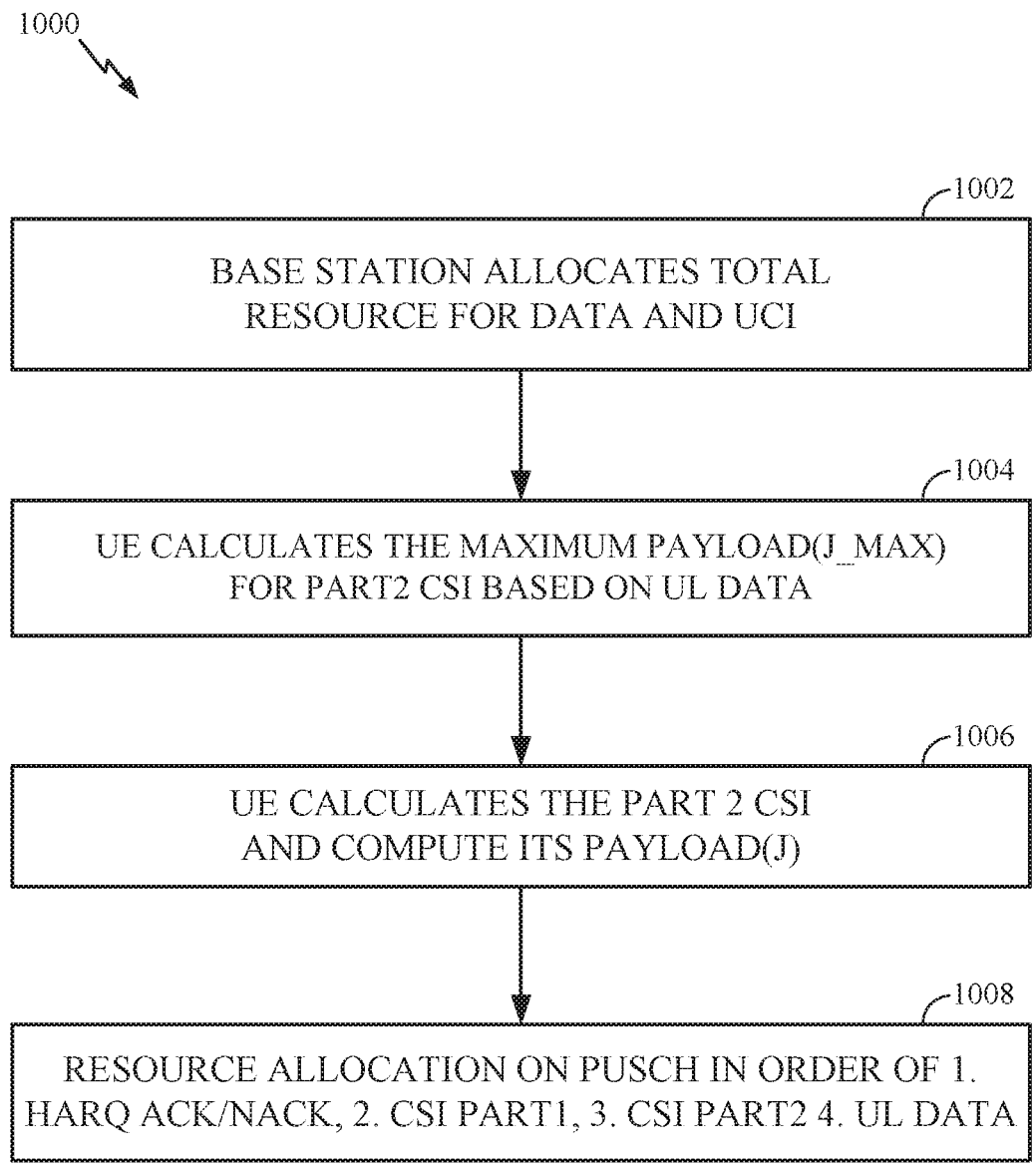
FIGS. 10 and 11 illustrate example operations that may be performed by a UE to determine UCI payload, in accordance with certain aspects of the present disclosure.

An example of this approach is shown in FIG. 10. As illustrated, at 1002, a base station may first allocate total resources (for UCI and data). At 1004, the UE may calculate the maximum payload (J_max) for part 2 CSI based on the UL data. At 1006, the UE calculates the part 2 CSI and computes the payload. At 1008, UE may determine resource allocation on PUSCH, for example, in order of:

1. HARQ ACK/NACK,
2. CSI part1,
3. CSI part 2, and
4. UL data.

In some cases, a UE may be allocated UL data resources prior to part2 CSI reporting. In such cases, the resource allocation sequence may be changed such that resource for data is allocated prior to part2 CSI reporting.

Figure 11:
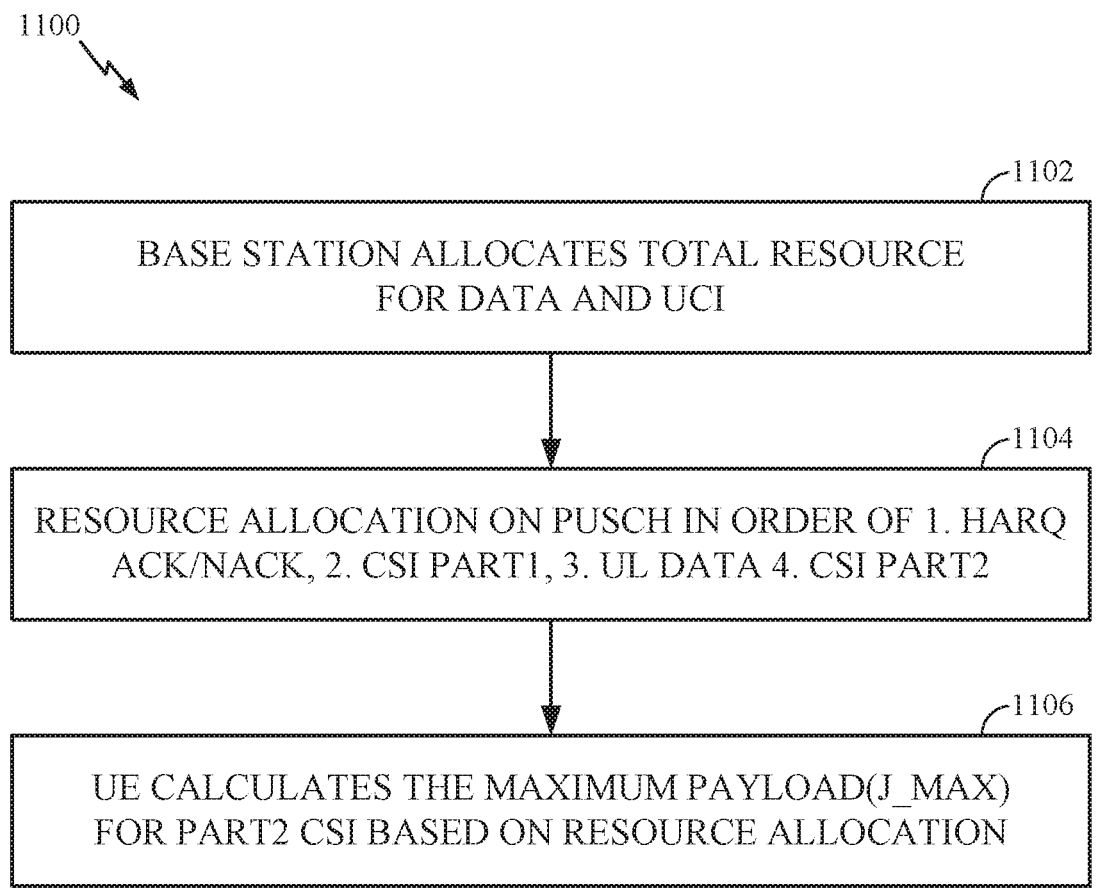

For example, as illustrated in FIG. 11, a base station may first allocate total resources for data and UCI, at 1102. At 1104, the UE may allocate UL resources, with the order of UCI and data as follows (in order of priority):

1. HARQ ACK/NACK,
2. CSI part1,
3. UL data, and
4. CSI part 2.

And the UE may calculate, at 1106, the maximum payload (J_max) for the part 2 CSI based on the resource allocation (after allocating resources for other UCI and data per 1104).

In some cases, each CSI report setting may have its own associated part2 CSI maximum payload. In such cases, each CSI reporting setting may define its own part2 CSI maximum payload J_max. Again, J_max can be higher layer configured, or predefined based on the CSI reporting configurations (e.g., based on a #ports, Type I or Type II CSI). If multiple CSI reportings are triggered in one PUSCH reporting time, then the summation of:

$J\_max = sum(J\_k)$ will be used as a maximum part2 payload, where J_k is the configured maximum CSI reporting size for the $k^{th}$ CSI reporting.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 9, 10 and 11 may be performed by various processors shown in FIG. 4.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    determining a total amount of allocated resources for transmitting both uplink data and uplink control information (UCI) in a physical uplink shared channel (PUSCH) transmission, wherein the UCI includes a part1 channel state information (CSI) and a part2 CSI;
    determining a supported payload size for transmitting the part2 CSI based, at least in part, on the total amount of allocated resources and an amount of resources allocated for the uplink data, wherein the supported payload size for transmitting the part2 CSI is determined based on a signaled parameter (alpha) multiplied by the total amount of allocated resources; and
    transmitting the uplink data and the UCI in the PUSCH, based on the supported payload size for transmitting the part2 CSI.

2. The method of claim 1, wherein the UCI comprises a type of CSI of a dynamic payload size.

3. The method of claim 1, wherein the supported payload size for transmitting the part2 CSI is determined based on a payload size of the uplink data.

4. The method of claim 1, wherein the amount of resources allocated for the uplink data is conveyed via higher layer signaling, semi-static signaling, or lower layer signaling.

5. The method of claim 1, wherein the supported payload size for transmitting the part2 CSI is determined based on a number of resource blocks (RBs) or resource elements (REs) allocated for the uplink data.

6. The method of claim 5, wherein determining the supported payload size for transmitting the part2 CSI comprises:
    determining a number of REs or RBs available for transmitting the part2 CSI by subtracting the number of RBs or REs allocated for the uplink data from a number of REs or RBs allocated for the PUSCH; and
    determining a number of part2 CSI bits that can be transmitted in the PUSCH based on the number of REs or RBs available for transmitting the part2 CSI and a coding rate of the PUSCH.

7. The method of claim 1, wherein the supported payload size for transmitting the part2 CSI is determined by allocating PUSCH resources to the uplink data before allocating PUSCH resources for part2 CSI.

8. The method of claim 1, wherein: the UCI comprises CSI reported according to at least one of a plurality of CSI report settings, wherein each CSI report setting is associated with a respective maximum payload.

9. The method of claim 8, wherein, if multiple CSI reportings are triggered in one PUSCH reporting, then a maximum payload size for transmitting the UCI is determined based on a summation of the respective maximum payload associated with each of the CSI reportings triggered.

10. The method of claim 1, wherein the supported payload size for transmitting the part2 CSI is based at least in part on resource elements assigned to the part1 CSI.

11. The method of claim 1, wherein a part of the UCI is dropped when a size of the UCI is larger than the determined supported payload size.

12. An apparatus for wireless communications by a user equipment (UE), comprising:
means for determining a total amount of allocated resources for transmitting both uplink data and uplink control information (UCI) in a physical uplink shared channel (PUSCH) transmission, wherein the UCI includes a part1 channel state information (CSI) and a part2 CSI;
means for determining a supported payload size for transmitting the part2 CSI based, at least in part, on the total amount of allocated resources and an amount of resources allocated for the uplink data, wherein the supported payload size for transmitting the part2 CSI is determined based on a signaled parameter (alpha) multiplied by the total amount of allocated resources; and
means for transmitting the uplink data and the UCI in the PUSCH, based on the supported payload size for transmitting the part2 CSI.

13. The apparatus of claim 12, wherein the UCI comprises a type of CSI of a dynamic payload size.

14. The apparatus of claim 12, wherein the supported payload size for transmitting the part2 CSI is determined based on a payload size of the uplink data.

15. The apparatus of claim 12, wherein the amount of resources allocated for the uplink data is conveyed via higher layer signaling, semi-static signaling, or lower layer signaling.

16. The apparatus of claim 12, wherein the supported payload size for transmitting the part2 CSI is determined based on a number of resource blocks (RBs) or resource elements (REs) allocated for the uplink data.

17. The apparatus of claim 16, wherein the means for determining the supported payload size for transmitting the part2 CSI comprises:
means for determining a number of REs or RBs available for transmitting the part2 CSI by subtracting the number of RBs or REs allocated for the uplink data from a number of REs or RBs allocated for the PUSCH; and
means for determining a number of part2 CSI bits that can be transmitted in the PUSCH based on the number of REs or RBs available for transmitting the part2 CSI and a coding rate of the PUSCH.

18. The apparatus of claim 12, wherein the supported payload size for transmitting the part2 CSI is determined by allocating PUSCH resources to uplink data before allocating PUSCH resources for part2 CSI.

19. The apparatus of claim 12, wherein: the UCI comprises CSI reported according to at least one of a plurality of CSI report settings; wherein each CSI report setting is associated with a respective maximum payload.

20. The apparatus of claim 19, wherein, if multiple CSI reportings are triggered in one PUSCH reporting, then a maximum payload size for transmitting the UCI is determined based on a summation of the respective maximum payload associated with each of the CSI reportings triggered.

21. An apparatus for wireless communications by a user equipment (UE), comprising:
at least one processor configured to:
determine a total amount of allocated resources for transmitting both uplink data and uplink control information (UCI) in a physical uplink shared channel (PUSCH) transmission; wherein the UCI includes a part1 channel state information (CSI) and a part2 CSI, and
determine a supported payload size for transmitting the part2 CSI based, at least in part; on the total amount of allocated resources and an amount of resources allocated for the uplink data, wherein the supported payload size for transmitting the part2 CSI is determined based on a signaled parameter (alpha) multiplied by the total amount of allocated resources; and
a transmitter configured to transmit uplink data and the UCI in the PUSCH, based on the supported payload size for transmitting the part2 CSI.

22. The apparatus of claim 21, wherein the supported payload size for transmitting the part2 CSI is based at least in part on resource elements assigned to the part1 CSI.

23. A non-transitory computer readable medium having instructions stored thereon for:
determining a total amount of allocated resources for transmitting both uplink data and uplink control information (UCI) in a physical uplink shared channel (PUSCH) transmission, wherein the UCI includes a part1 channel state information (CSI) and a part2 determining a supported payload size for transmitting the part2 CSI based, at least in part, on the total amount of allocated resources and an amount of resources allocated for the uplink data, wherein the supported payload size for transmitting the part2 CSI is determined based on a signaled parameter (alpha) multiplied by the total amount of allocated resources; and
transmitting the uplink data and the UCI in the PUSCH, based on the supported payload size for transmitting the part2 CSI.

* * * * *